US009134838B2

(12) United States Patent
Kuo

(10) Patent No.: US 9,134,838 B2
(45) Date of Patent: Sep. 15, 2015

(54) TOUCH PANEL

(71) Applicant: Acer Incorporated, New Taipei (TW)

(72) Inventor: Jin-Ting Kuo, New Taipei (TW)

(73) Assignee: Acer Incorporated, New Taipei (TW)

( * ) Notice: Subject to any disclaimer, the term of this patent is extended or adjusted under 35 U.S.C. 154(b) by 304 days.

(21) Appl. No.: 13/893,301

(22) Filed: May 13, 2013

(65) Prior Publication Data

US 2014/0225843 A1 Aug. 14, 2014

(30) Foreign Application Priority Data

Feb. 8, 2013 (TW) ............................ 102105325 A

(51) Int. Cl.
*G06F 3/041* (2006.01)
*G06F 3/044* (2006.01)

(52) U.S. Cl.
CPC .............. *G06F 3/0412* (2013.01); *G06F 3/044* (2013.01)

(58) Field of Classification Search
CPC ....................................................... G06F 3/044
USPC .................................................. 345/156–184
See application file for complete search history.

(56) References Cited

U.S. PATENT DOCUMENTS

2011/0032209 A1* 2/2011 Kim .............................. 345/174
2012/0306791 A1 12/2012 Lee et al.
2013/0033446 A1 2/2013 Liu
2013/0038542 A1* 2/2013 Kim .............................. 345/173
2013/0307798 A1* 11/2013 Wang et al. .................... 345/173
2014/0118274 A1* 5/2014 Tenuta .......................... 345/173
2014/0247226 A1* 9/2014 Chiu et al. .................... 345/173

FOREIGN PATENT DOCUMENTS

| | | |
|---|---|---|
| TW | M414616 | 10/2011 |
| TW | M414620 | 10/2011 |
| TW | 201209691 | 3/2012 |
| TW | M428424 | 5/2012 |
| TW | M437991 | 9/2012 |
| TW | M446367 | 2/2013 |

* cited by examiner

*Primary Examiner* — Jimmy H Nguyen
*Assistant Examiner* — Hang Lin
(74) *Attorney, Agent, or Firm* — Jianq Chyun IP Office

(57) ABSTRACT

A touch panel providing a touch signal is disclosed. The touch panel includes a substrate, a first visual masking layer, an electrode layer, a metal material layer, and a second visual masking layer. The substrate has a surface. The first visual masking layer is disposed on at least one edge area of the surface. A part of the electrode layer is disposed at a display area on the surface adjacent to the edge area, and another part of the electrode layer covers at least a portion of the first visual masking layer. The metal material layer is disposed at the edge area and electrically connected with the electrode layer. The second visual masking layer is disposed at the edge area and stacked on the first visual masking layer. The said another part of the electrode layer is sandwiched between the first visual masking layer and the second visual masking layer.

11 Claims, 10 Drawing Sheets

160 100a 150a 112 130 140 120a 110 D E

TOUCH PANEL

CROSS-REFERENCE TO RELATED APPLICATION

This application claims the priority benefit of Taiwan application serial no. 102105325, filed on Feb. 8, 2013. The entirety of the above-mentioned patent application is hereby incorporated by reference herein and made a part of this specification.

BACKGROUND OF THE INVENTION

1. Field of the Invention

The present invention generally relates to a touch panel, and more particularly, to a touch panel with a visual masking layer.

2. Description of Related Art

In recent years, electronic devices, such as notebooks (NB), tablet PCs, and smart phones, have been widely used in our daily life along with the development of technologies. Some of aforementioned electronic devices are designed very small-sized and light-weighted therefore can be conveniently operated and carried around. Different types of electronic devices with diversified functionalities have been developed, and user-friendliness and practicality of these electronic devices make them very popular and allow them to be used regarding different purposes. Thus, a user can hold an electronic device with a single hand and operate the electronic device by touching or pressing a keyboard or a touch panel located on the operation panel of the electronic device.

In an electronic device, an electrode layer is disposed at the display area of the touch panel for sensing touch events. When an object touches or approaches the touch panel, the electrode layer generates a touch signal correspondingly. A visual masking layer is usually disposed around the display area of the touch panel (at a non-display area) to shield the peripheral circuits of the touch panel. The visual masking layer at the non-display area needs to be thick enough so that it won't affect the appearance of the touch panel. The brighter color (for example, gray or white) the visual masking layer has, the thicker the visual masking layer should be. Additionally, to enhance the touch input function of the operating system, an electrode layer may also be disposed at the non-display area to allow the non-display area to provide touch sensing signals. However, a height difference should exist between the surface of the visual masking layer at the non-display area and the surface of the display area. When an electrode layer is disposed on the surface of the visual masking layer and the surface of the display area, the height difference between the visual masking layer and the display area may cause circuit breakage in the electrode layer.

SUMMARY OF THE INVENTION

Accordingly, the present invention is directed to a touch panel, in which the height difference between a visual masking layer and a display area covered by an electrode layer is reduced and accordingly the yield rate of the touch panel is improved.

The present invention provides a touch panel for providing a touch signal. The touch panel includes a substrate, a first visual masking layer, an electrode layer, a metal material layer, and a second visual masking layer. The substrate has a surface. The first visual masking layer is disposed on at least one edge area of the surface. A part of the electrode layer is disposed at a display area on the surface adjacent to the edge area, and another part of the electrode layer covers at least a portion of the first visual masking layer. When the touch panel is touched or approached by an object, the electrode layer generates the touch signal correspondingly. The metal material layer is disposed at the edge area and electrically connected with the electrode layer. The metal material layer transmits the touch signal to a driving element. The second visual masking layer is disposed at the edge area and stacked on the first visual masking layer. The said another part of the electrode layer is sandwiched between the first visual masking layer and the second visual masking layer.

As described above, in a touch panel provided by the present invention, the visual masking layer is a configuration of multiple layers. When the first visual masking layer is disposed at the edge area, the electrode layer can be disposed on the display area and the first visual masking layer. After that, the second visual masking layer is covered on the electrode layer. Thus, in the touch panel provided by the present invention, the thickness of the visual masking layers is maintained so that the appearance of the touch panel won't be affected, and the height difference between the display area and the edge area which are covered by the electrode layer is reduced so that circuit breakage in the electrode layer caused by large height difference can be avoided.

These and other exemplary embodiments, features, aspects, and advantages of the invention will be described and become more apparent from the detailed description of exemplary embodiments when read in conjunction with accompanying drawings.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
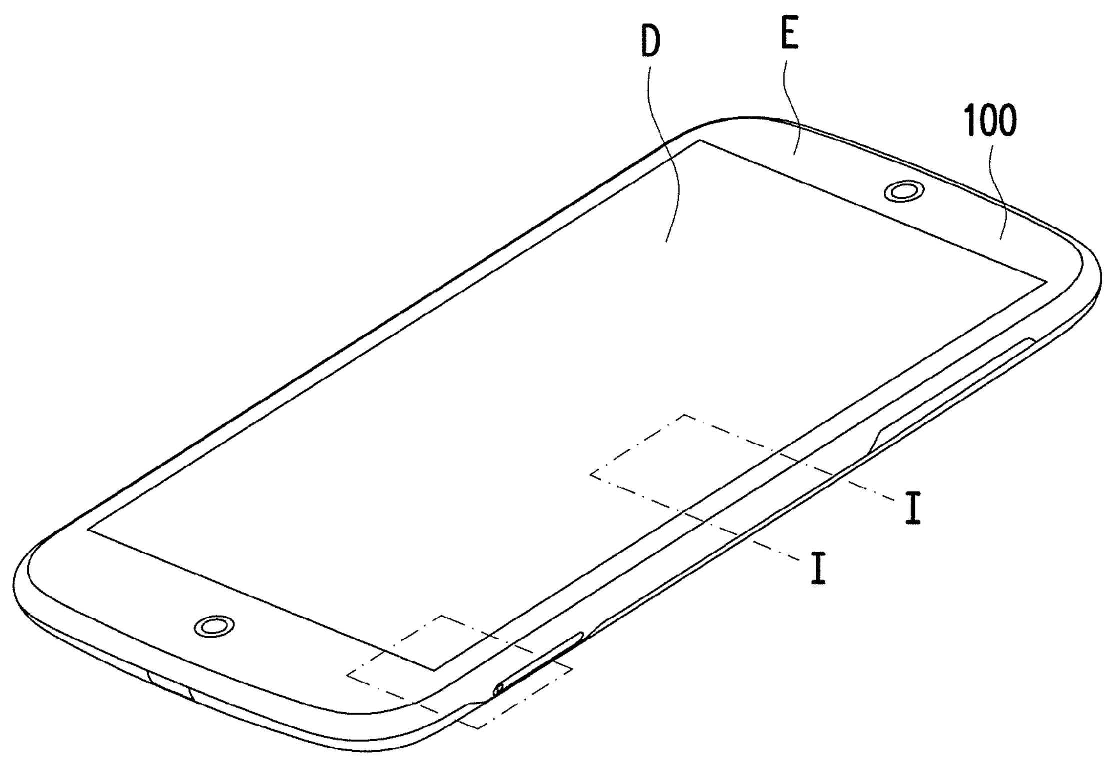
FIG. 1A is a diagram of a touch panel according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 1B:
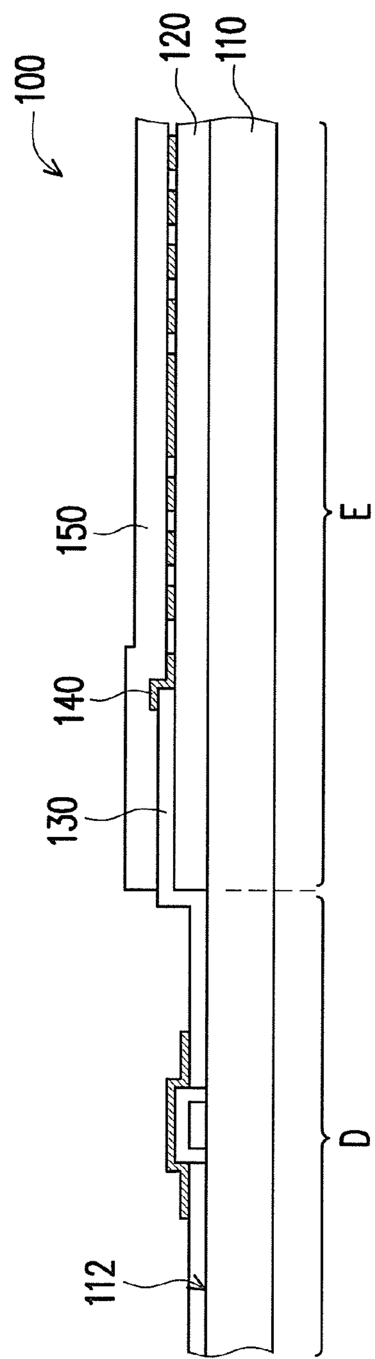
FIG. 1B is a cross-sectional view of the touch panel in FIG. 1A along line I-I.
Figure 1C:
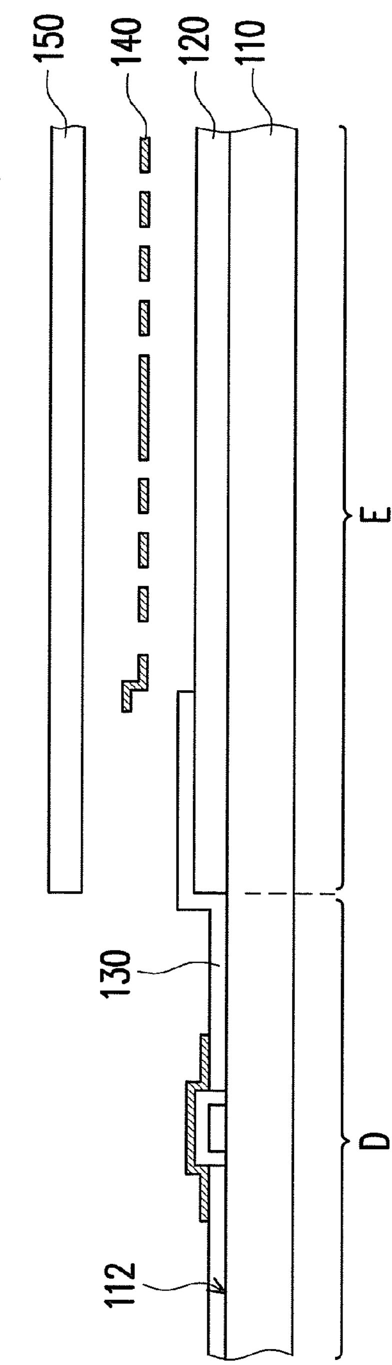
FIG. 1C is an exploded view of the touch panel in FIG. 1B.

FIG. 1A is a diagram of a touch panel according to an embodiment of the present invention. FIG. 1B is a cross-sectional view of the touch panel in FIG. 1A along line I-I. FIG. 1C is an exploded view of the touch panel in FIG. 1B. Referring to FIGS. 1A-1C, the touch panel 100 in the present embodiment provides a touch signal. The touch panel 100 includes a substrate 110, a first visual masking layer 120, an electrode layer 130, a metal material layer 140, and a second visual masking layer 150. The substrate 110 has a surface 112. The first visual masking layer 120 is disposed on at least one edge area E of the surface 112.

After the first visual masking layer 120 is disposed, the electrode layer 130 is disposed on the surface 112 of the substrate 110. herein a first part of the electrode layer 130 is disposed at a display area D of the surface 112 that is adjacent to the edge area E, and a second part of the electrode layer 130 covers at least a portion of the first visual masking layer 120. When the touch panel 100 is touched or approached by an object, the electrode layer 130 generates a touch signal correspondingly. In the present embodiment, the material of the electrode layer 130 may be made of a transparent conductive material or a semitransparent conductive material, such as indium-tin oxide (ITO) or another conductive material. Because circuit breakage may be caused in the electrode layer 130 if the first visual masking layer 120 is too thick, the thickness of the first visual masking layer 120 can be designed to be between 10 μm and 20 μm. In other embodiments, the thickness of the first visual masking layer 120 can be determined according to the light transmittance of the material of the visual masking layers and the characteristic of the material of the electrode layer 130.

After the electrode layer 130 is disposed, the metal material layer 140 is disposed on the first visual masking layer 120 at the edge area E and electrically connected with the electrode layer 130. In the present embodiment, the metal material layer 140 can be made of any conductive material. The metal material layer 140 can transmit the touch signal to a driving element (not shown).

After the metal material layer 140 is disposed, the second visual masking layer 150 is disposed at the edge area E and stacked on the first visual masking layer 120. Namely, the second visual masking layer 150 is covered on the second part of the electrode layer 130 and the metal material layer 140. Thus, the second part of the electrode layer 130 and the metal material layer 140 are sandwiched between the first visual masking layer 120 and the second visual masking layer 150.

In the present embodiment, the touch panel 100 may be disposed on the screen of a cell phone, and the display area D of the touch panel 100 can be served as a touch sensing interface. The visual masking layers 120 and 150 are disposed on the edge area E surrounding the display area D to cover the circuits outside the touch sensing area of the touch panel 100 (for example, the metal material layer 140 connected with the electrode layer 130), so as to achieve an aesthetic appearance. For example, the visual masking layers disposed at the edge area E may be white ink. Because white ink offers poor visual masking performance, multiple layers of the visual masking layers (for example, the first visual masking layer 120 and the second visual masking layer 150 in FIG. 1B) can be coated to enhance the visual masking effect.

Thereby, in the touch panel 100 provided by the present embodiment, the thickness of the visual masking layers 120 and 150 is maintained so that an aesthetic appearance is achieved, and the height difference between the electrode layer 130 at the display area D and the electrode layer 130 at the edge area E is reduced so that circuit breakage in the electrode layer 130 caused by large height difference is avoided.

Figure 1D:
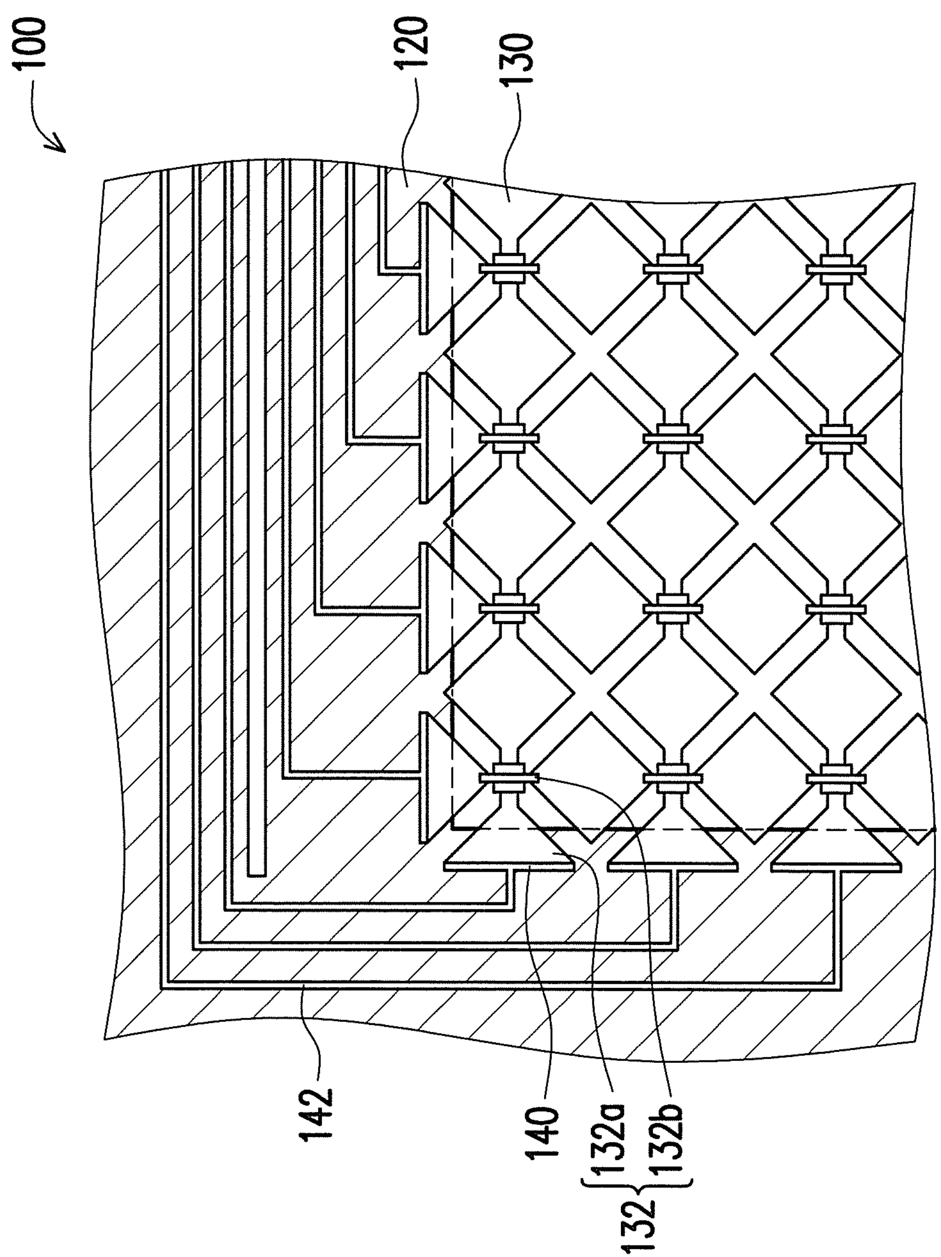
FIG. 1D is a diagram of the touch panel in FIG. 1A after a first visual masking layer is disposed.

FIG. 1D is a diagram of the touch panel in FIG. 1A after a first visual masking layer is disposed. Referring to FIG. 1C and FIG. 1D, the first visual masking layer 120 and the second visual masking layer 150 are disposed at the edge area E to cover a portion of the electrode layer 130 and the metal material layer 140. The electrode layer 130 is composed of a plurality of sensing circuits 132 that is arranged in a staggered way. Each sensing circuit 132 includes a plurality of diamond-shaped electrodes 132*a*, and each diamond-shaped electrode 132*a* further includes a connection line 132*b*. The electrode layer 130 may be covered on the first visual masking layer 120 by covering a part of the diamond-shaped electrodes 132*a* on the first visual masking layer 120. However, how the electrode layer 130 covers the first visual masking layer 120 is not limited in the present invention, and in other embodiments (not shown) of the present invention, the electrode layer may be covered on the first visual masking layer by only covering the connection lines on the first visual masking layer or covering half or entire diamond-shaped electrodes and the connection lines on the first visual masking layer.

Figure 2A:
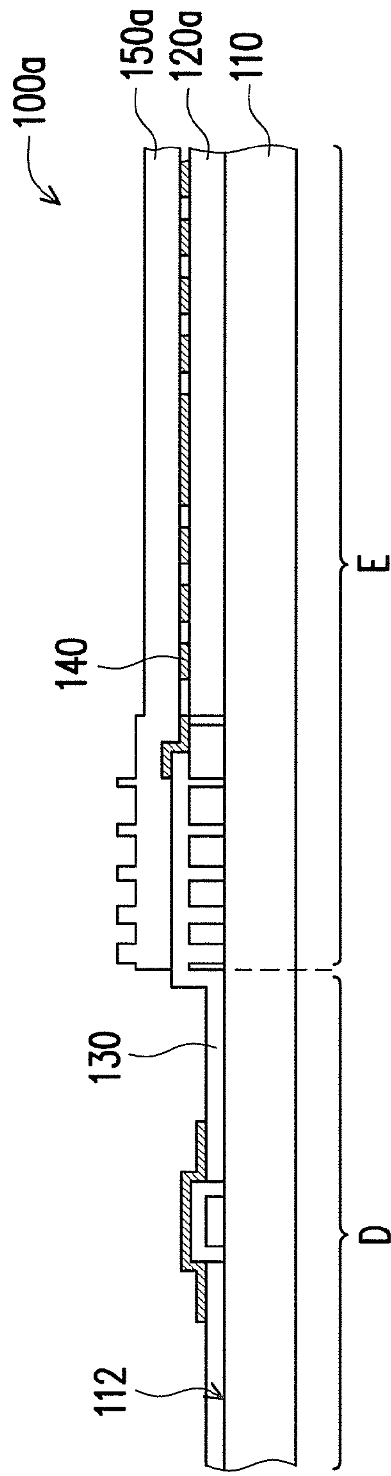
FIG. 2A is a cross-sectional view of a touch panel according to another embodiment of the present invention.
Figure 2B:
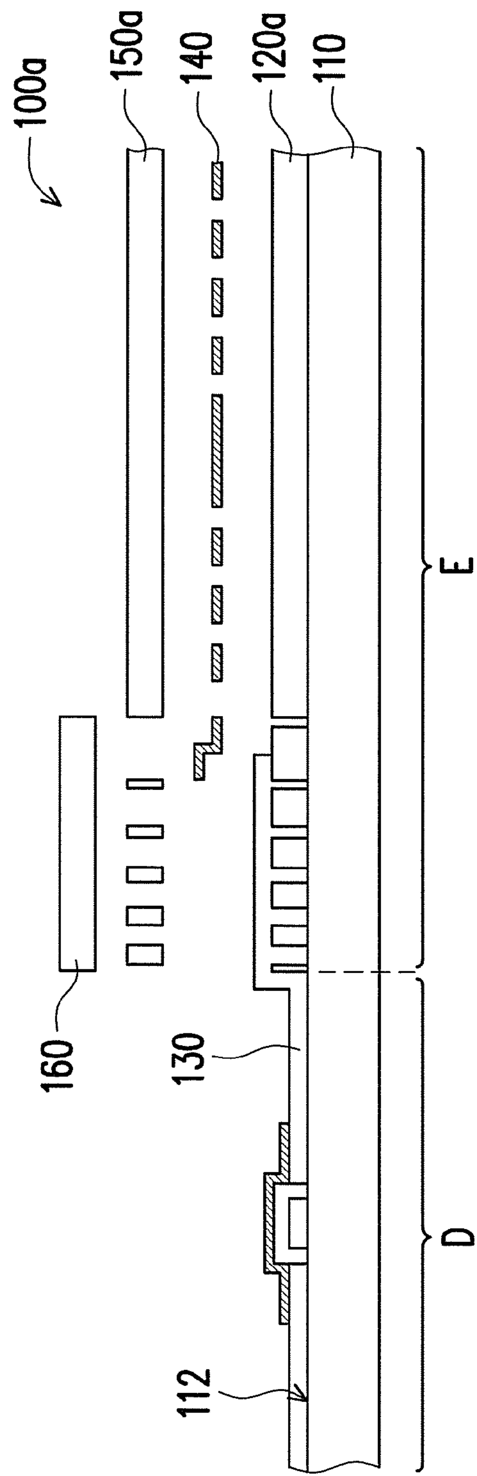
FIG. 2B is an exploded view of the touch panel in FIG. 2A.
Figure 2C:
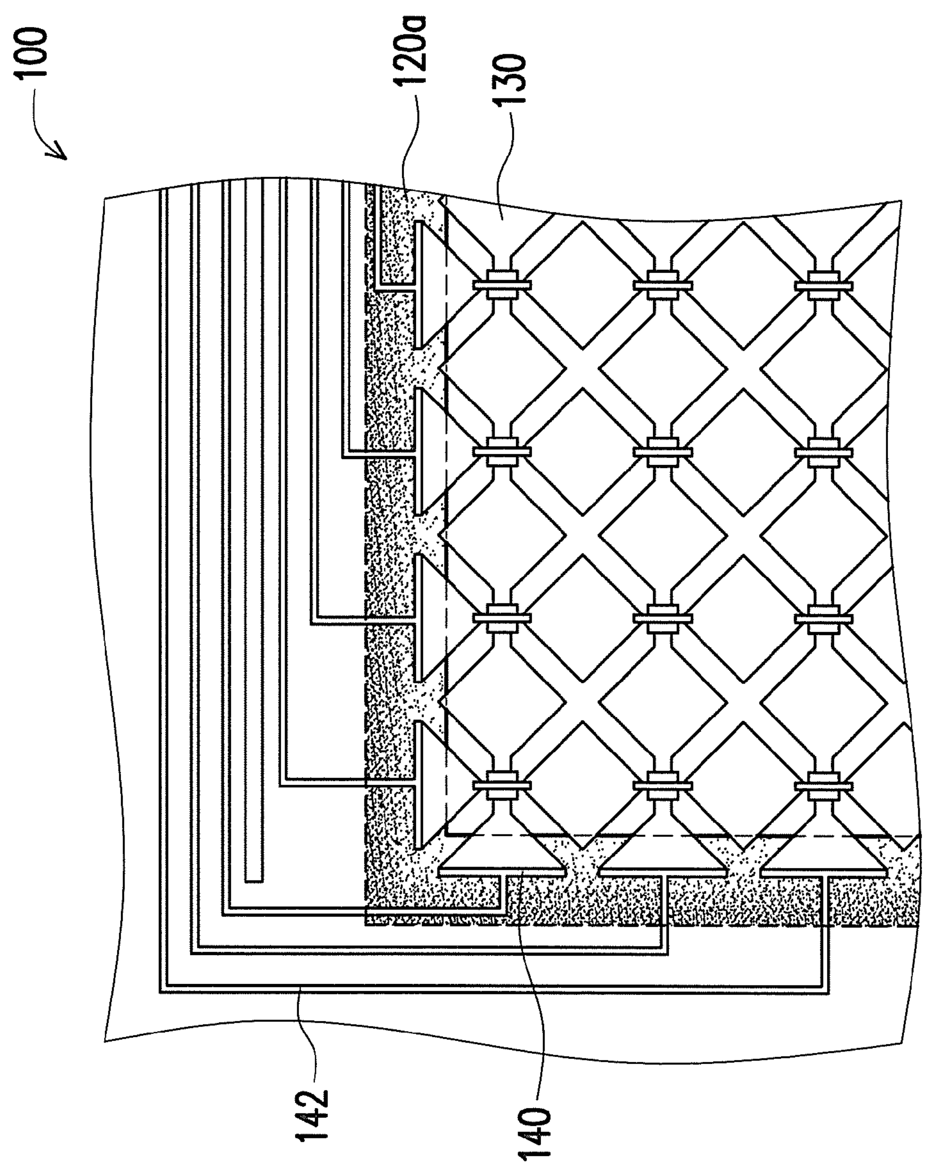
FIG. 2C is a diagram of the touch panel in FIG. 2A after a first visual masking layer is disposed.

FIG. 2A is a cross-sectional view of a touch panel according to another embodiment of the present invention. FIG. 2B is an exploded view of the touch panel in FIG. 2A. FIG. 2C is a diagram of the touch panel in FIG. 2A after a first visual masking layer is disposed. In FIG. 2C, to illustrate the metal material layer 140 of the touch panel clearly, the gradient and the ink dots P outside the area enclosed by dotted lines are omitted. The embodiment illustrated in FIGS. 2A-2C can be understood by referring to descriptions related to FIGS. 1B-1D. However, unlike the touch panel 100 illustrated in FIGS. 1B-1D, in the touch panel 100*a* illustrated in FIGS. 2A-2C, gradients are disposed on the visual masking layers 120*a* and 150*a*. Referring to FIGS. 2A-2C, the gradients are disposed because the material of the electrode layer 130 may not be completely transparent. To reduce the chromatic aberration between the electrode layer 130 and the visual masking layers 120*a* and 150*a*, the first visual masking layer 120*a* and the second visual masking layer 150*a* are gradiently disposed. In the present embodiment, the gradient of the first visual masking layer 120*a* is reverse to the gradient of the second visual masking layer 150*a*. For example, in the present embodiment, the gradient of the first visual masking layer 120*a* decreases along the direction towards the display area D. In other words, the end of the first visual masking layer 120*a* close to the display area D has lighter color, so that the chromatic aberration between the electrode layer 130 and the first visual masking layer 120*a* is not obvious. Contrarily, the second visual masking layer 150*a* covering the electrode layer 130 and the first visual masking layer 120*a* has darker color at its end close to the display area D, so that the gradient of the second visual masking layer 150*a* complements the gradient of the first visual masking layer 120*a* and the color of the edge area E is uniform.

Figure 2D:
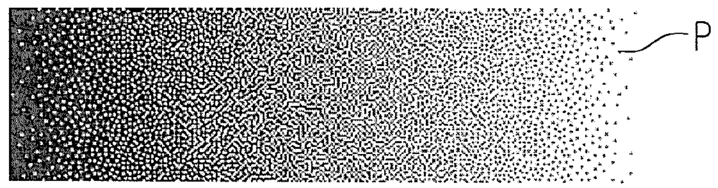
FIGS. 2D-2H are diagrams of different gradient effects achieved by different arrangements of ink dots P in FIG. 2A.
Figure 2E:
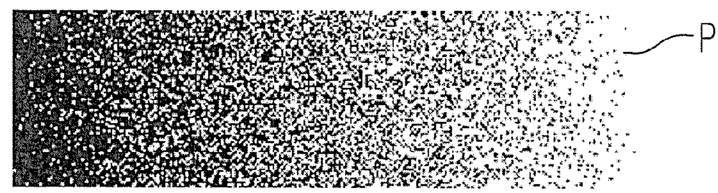
Figure 2F:
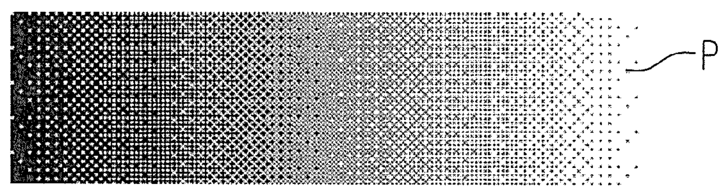
Figure 2G:
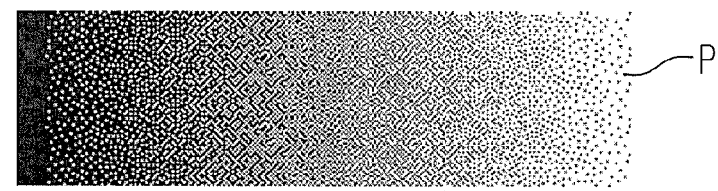
Figure 2H:
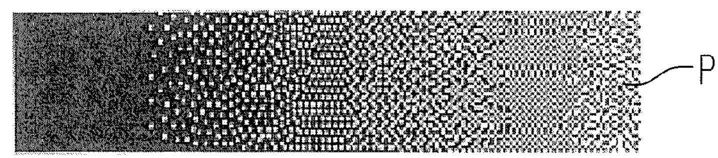

In FIG. 2A, the gradients of the first visual masking layer 120*a* and the second visual masking layer 150*a* are respectively composed of a plurality of ink dots P, where the width of each ink dot P is between 50 μm and 100 μm. In the present embodiment, the gradient effect on the visual masking layers 120*a* and 150*a* can be produced by adjusting the distribution and arrangement of the ink dots P. FIGS. 2D-2H are diagrams of different gradient effects achieved by different arrangements of the ink dots P in FIG. 2A. In the gradient illustrated in FIG. 2A, the ink dots P are distributed and arranged in a dispersed dot pattern (as shown in FIG. 2D), a randomly dispersed pattern (as shown in FIG. 2E), a grayscale dispersion pattern (as shown in FIG. 2F), a chessboard pattern (as shown in FIG. 2G), or a combination of the chessboard pattern and the grayscale dispersion pattern (as shown in FIG. 2H). However, the size and arrangement of the ink dots P are not limited in the present invention.

Additionally, the first visual masking layer 120*a* and the second visual masking layer 150*a* are both ink in a bright color (for example, white) and are gradiently disposed. To avoid any impact on the appearance brought by insufficient thickness of the white ink, the touch panel 100*a* further includes at least one third visual masking layer 160 disposed on the second visual masking layer 150*a*. In the present embodiment, the total thickness of the first visual masking layer 120*a*, the second visual masking layer 150*a*, and the third visual masking layer 160 is between 40 μm and 50 μm. For example, the thickness of the first visual masking layer 120*a* is between 10 μm and 20 μm, and the thicknesses of the second visual masking layer 150*a* and the third visual masking layer 160 are adjusted according to the actual requirement. However, the present invention is not limited thereto, and in other embodiments, if the total thickness of the first visual masking layer 120 and the second visual masking layer 150 is sufficient for achieving a visual masking effect, the third visual masking layer 160 can be omitted according to the product design requirement.

Referring to FIGS. 2A-2C again, the metal material layer 140 and the electrode layer 130 are electrically connected with each other. When the electrode layer 130 detects a touch event (for example, a user's finger approaches the electrode layer 130), the metal material layer 140 transmits the touch signal generated by the electrode layer 130 to a driving element (not shown) of the touch panel 100*a*. In the present embodiment, the metal material layer 140 is disposed between the first visual masking layer 120*a* and the second visual masking layer 150*a*. The metal material layer 140 includes a plurality of metal wires 142, and the width of each metal wire 142 is between 5 μm and 30 μm.

Figure 3A:
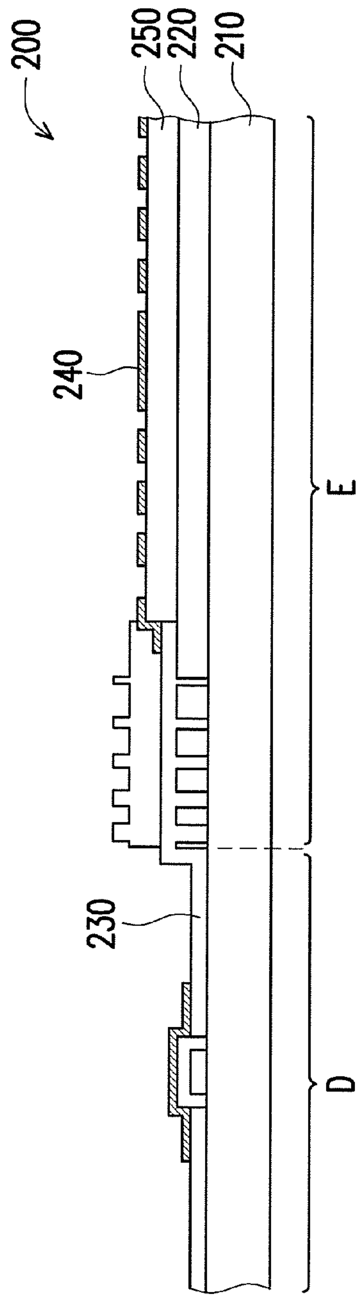
FIG. 3A is a cross-sectional view of a touch panel according to yet another embodiment of the present invention.
Figure 3B:
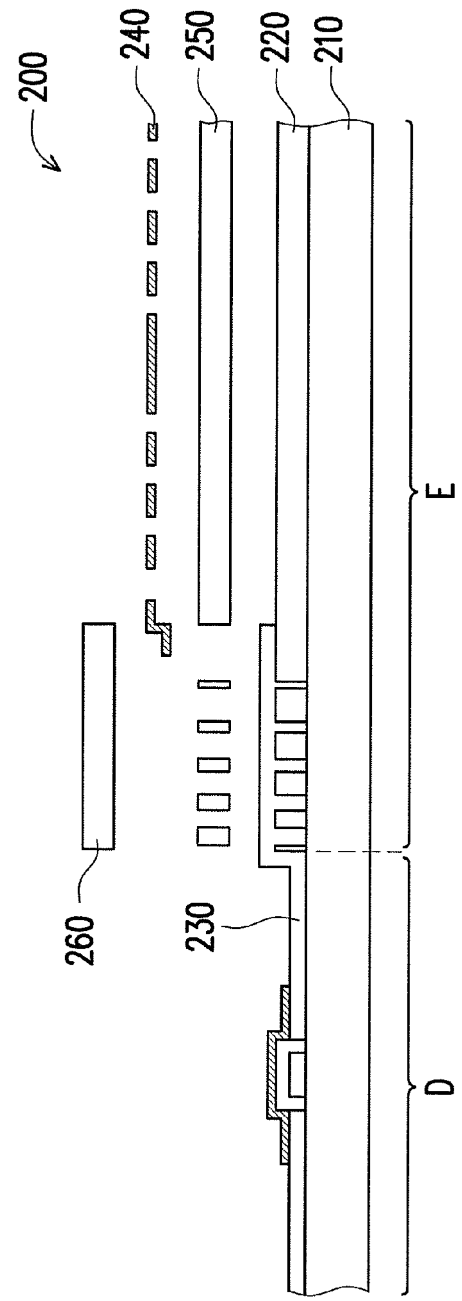
FIG. 3B is an exploded view of the touch panel in FIG. 3A.

However, the disposed position of the metal material layer is not limited in the present invention, which will be explained with reference to another embodiment. FIG. 3A is a cross-sectional view of a touch panel according to yet another embodiment of the present invention. FIG. 3B is an exploded view of the touch panel in FIG. 3A. Referring to FIG. 3A and FIG. 3B, in the touch panel 200 illustrated in FIG. 3A, a first visual masking layer 220 is disposed on at least one edge area E of the substrate 210. After the first visual masking layer 220 is disposed, an electrode layer 230 is disposed on the substrate 210. After the electrode layer 230 is disposed, a second visual masking layer 250 is disposed at the edge area E and stacked on the first visual masking layer 220. Namely, the second visual masking layer 250 is covered on the electrode layer 230. Thus, a part of the electrode layer 230 is sandwiched between the first visual masking layer 220 and the second visual masking layer 250. After the second visual masking layer 250 is disposed, a metal material layer 240 is disposed on the second visual masking layer 250 at the edge area E.

Other aspects of the embodiment illustrated in FIG. 3A and FIG. 3B can be referred to descriptions related to FIG. 1B and FIG. 1C and descriptions related to FIG. 2A and FIG. 2B. The difference between the embodiment illustrated in FIG. 3A and FIG. 3B and the embodiment illustrated in FIG. 2A and FIG. 2B is that in the embodiment illustrated in FIG. 3A and FIG. 3B, the metal material layer 240 is disposed on the second visual masking layer 250. Even though as shown in FIG. 3A and FIG. 3B, the metal material layer 240 is sandwiched between the second visual masking layer 250 and the third visual masking layer 260, and the electrode layer 230 is sandwiched between the first visual masking layer 220 and the second visual masking layer 250, the metal material layer 240 can be passed through the spaces between the ink dots P on the second visual masking layer 250 and electrically connected with the electrode layer 230.

Figure 4A:
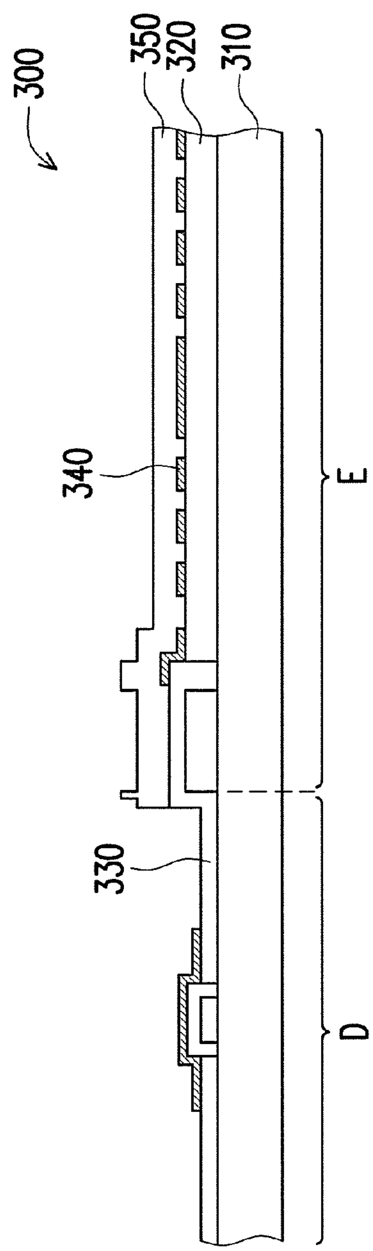
FIG. 4A is a cross-sectional view of a touch panel according to still another embodiment of the present invention.
Figure 4B:
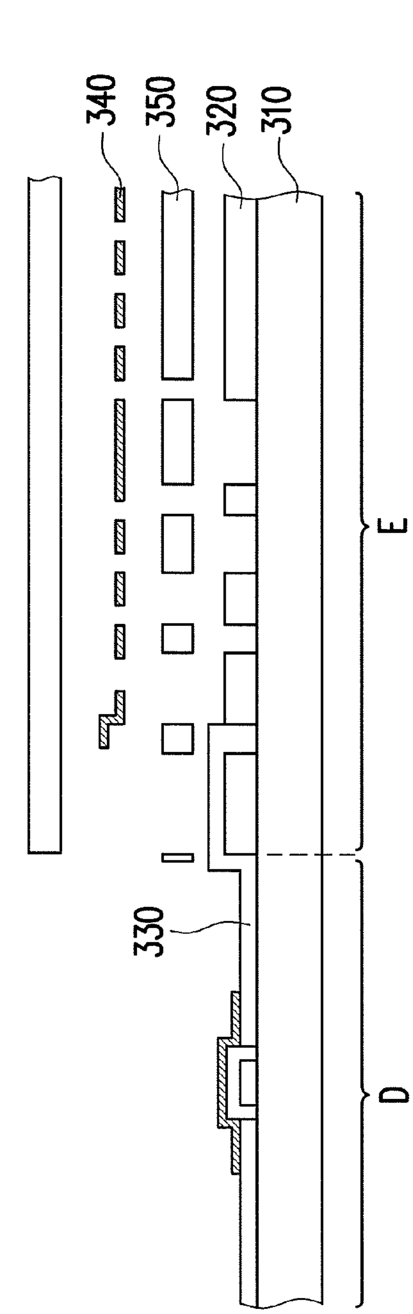
FIG. 4B is an exploded view of the touch panel in FIG. 4A.
Figure 4C:
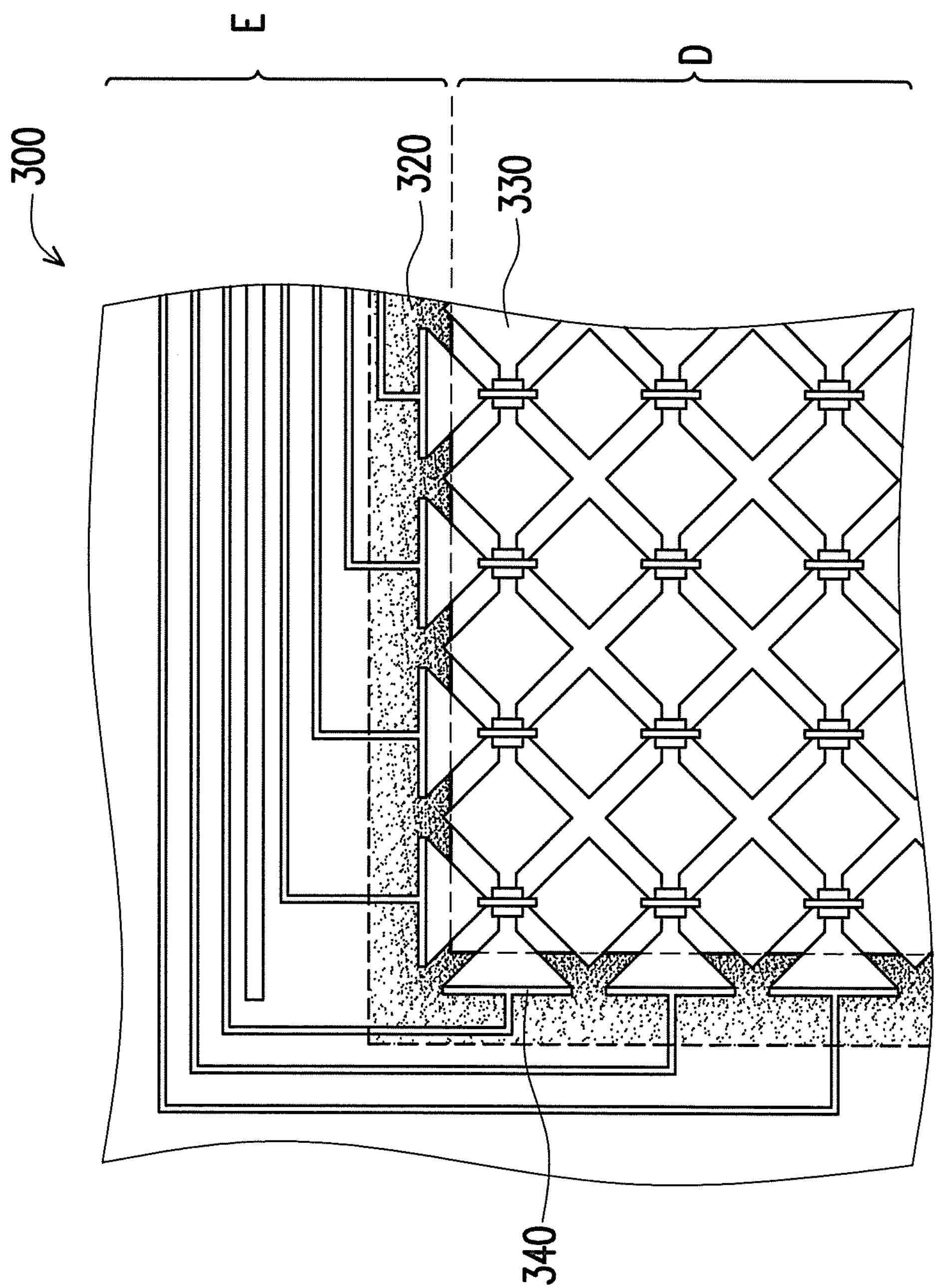
FIG. 4C is a diagram of the touch panel in FIG. 4A after a first visual masking layer is disposed.

Additionally, the gradient directions of the visual masking layers are not limited in the present invention. FIG. 4A is a cross-sectional view of a touch panel according to still another embodiment of the present invention. FIG. 4B is an exploded view of the touch panel in FIG. 4A. FIG. 4C is a diagram of the touch panel in FIG. 4A after a first visual masking layer is disposed. In FIG. 4C, to illustrate the metal material layer 340 of the touch panel clearly, the gradient and the ink dots P outside the area enclosed by the dotted lines are omitted. The embodiment illustrated in FIGS. 4A-4C can be referred to the descriptions related to FIGS. 1B-1D, the descriptions related to FIGS. 2A-2C, and the descriptions related to FIGS. 3A-3B. Referring to FIGS. 4A-4C, in the present embodiment, the touch panel 300 includes a substrate 310, a first visual masking layer 320, an electrode layer 330, a metal material layer 340, and a second visual masking layer 350. Besides, the first visual masking layer 320 and the second visual masking layer 350 are also gradiently disposed and have reverse gradient directions. However, in FIG. 4B, the gradient of the first visual masking layer 320 increases along the direction towards the display area D. In other words, the end of the first visual masking layer 320 away from the display area D has lighter color.

Figure 5A:
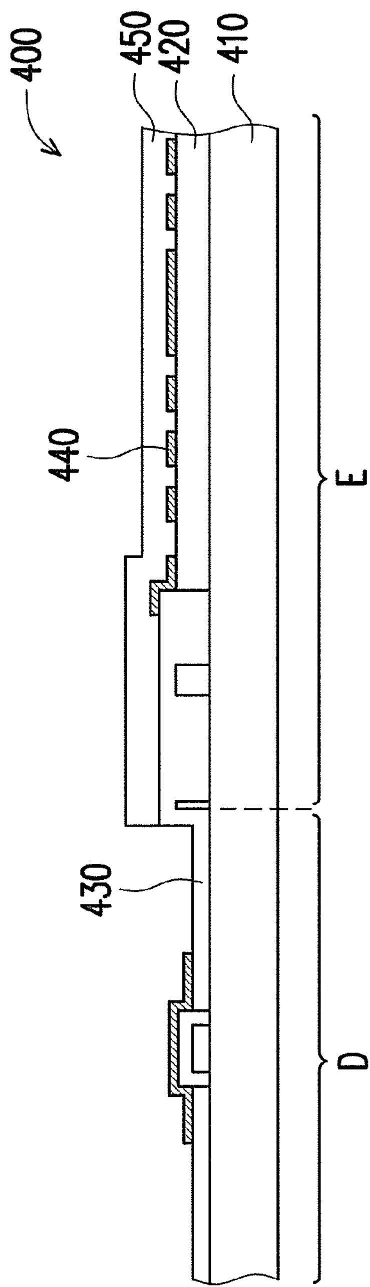
FIG. 5A is a cross-sectional view of a touch panel according to yet still another embodiment of the present invention.
Figure 5B:
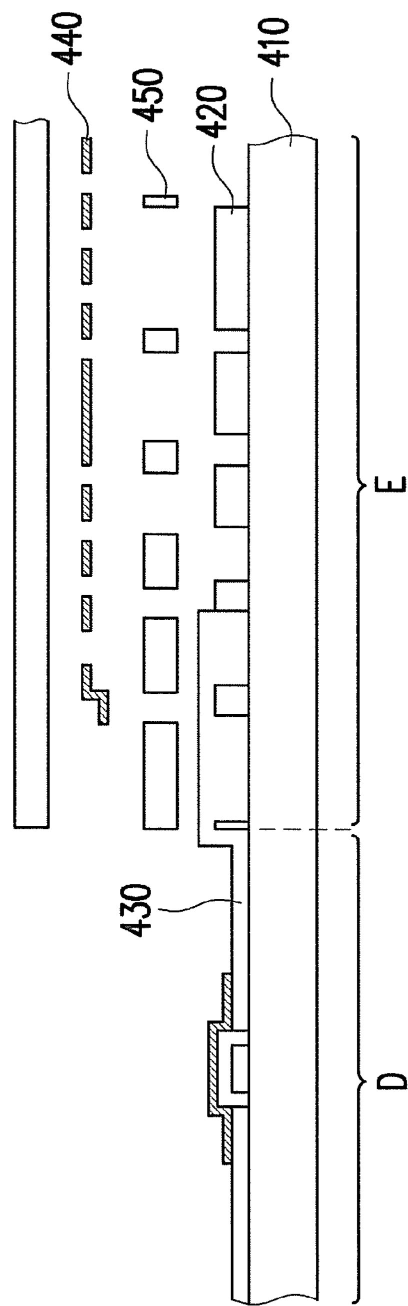
FIG. 5B is an exploded view of the touch panel in FIG. 5A.

Moreover, the proportion of the gradient in a visual masking layer is not limited in the present invention. FIG. 5A is a cross-sectional view of a touch panel according to yet still another embodiment of the present invention. FIG. 5B is an exploded view of the touch panel in FIG. 5A. The embodiment illustrated in FIGS. 5A-5B can be referred to the descriptions related to FIGS. 1B-1D, the descriptions related to FIGS. 2A-2C, the descriptions related to FIGS. 3A-3B, and the descriptions related to FIGS. 4A-4C. Referring to FIG. 5A and FIG. 5B, in the present embodiment, the touch panel 400 includes a substrate 410, a first visual masking layer 420, an electrode layer 430, a metal material layer 440, and a second visual masking layer 450. Unlike that in the touch panel 200 illustrated in FIGS. 3A-3B, the gradients of the first visual masking layer 420 and the second visual masking layer 450 are not only disposed at the annular area of the edge area E close to the display area D but also filled up the entire edge area E. In other words, the proportion of the gradient in each visual masking layer is not limited in the present invention and can be adjusted according to the design requirement.

As described above, in a touch panel provided by the present invention, the visual masking layer is a configuration of multiple layers. When the first visual masking layer is disposed at the edge area, the electrode layer can be disposed on the display area and the first visual masking layer. After that, the second visual masking layer is covered on the electrode layer. A gradient design can be further adopted by the first visual masking layer and the second visual masking layer to reduce the chromatic aberration between the visual masking layers and the electrode layer. Thus, in the touch panel provided by the present invention, the thickness of the visual masking layers is maintained so that the appearance of the touch panel won't be affected, and the height difference between the display area and the edge area which are covered by the electrode layer is reduced so that circuit breakage in the electrode layer caused by large height difference can be avoided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch panel, for providing a touch signal, the touch panel comprising: a substrate, having a surface; a first visual masking layer, disposed on at least one edge area of the surface; an electrode layer, wherein a part of the electrode layer is disposed at a display area on the surface adjacent to the edge area, and another part of the electrode layer covers at least a portion of the first visual masking layer, wherein when the touch panel is touched or approached by an object, the electrode layer generates the touch signal correspondingly; a metal material layer, disposed at the edge area, electrically connected with the electrode layer, wherein the metal material layer transmits the touch signal to a driving element; and a second visual masking layer, disposed at the edge area, and stacked on the first visual masking layer, wherein the another part of the electrode layer is sandwiched between the first visual masking layer and the second visual masking layer;

wherein the first visual masking layer and the second visual masking layer are gradiently disposed, and a gradient of the first visual masking layer is reverse to a gradient of the second visual masking layer;

wherein the gradients of the first visual masking layer and the second visual masking layer are formed by a plurality of ink dots, and a width of each of the ink dots is between 50 μm and 100 μm.

2. The touch panel according to claim 1, wherein the gradient of the first visual masking layer decreases along a direction towards the display area.

3. The touch panel according to claim 1, wherein the gradient of the first visual masking layer increases along a direction towards the display area.

4. The touch panel according to claim 1, wherein the ink dots of the first visual masking layer and the second visual masking layer are distributed and arranged in a dispersed dot pattern, a randomly dispersed pattern, a grayscale dispersion pattern, a chessboard pattern, or a combination of the chessboard pattern and the grayscale dispersion pattern.

5. The touch panel according to claim 1 further comprising a third visual masking layer disposed on the second visual masking layer.

6. The touch panel according to claim 1, wherein a thickness of the first visual masking layer is between 10 μm and 20 μm.

7. The touch panel according to claim 6, wherein a total thickness of the first visual masking layer, the second visual masking layer, and the third visual masking layer is between 40 μm and 50 μm.

8. The touch panel according to claim 1, wherein the metal material layer is disposed between the first visual masking layer and the second visual masking layer.

9. The touch panel according to claim 1, wherein the metal material layer is disposed on the second visual masking layer.

10. The touch panel according to claim 1, wherein a material of the first visual masking layer and the second visual masking layer is white ink.

11. The touch panel according to claim 1, wherein the metal material layer comprises a plurality of metal wires, and a width of each of the metal wires is between 5 μm and 30 μm.

* * * * *